May 31, 1938.  A. W. SIMOWSKI  2,119,298
GEAR FINISHING TOOL
Filed Nov. 18, 1935
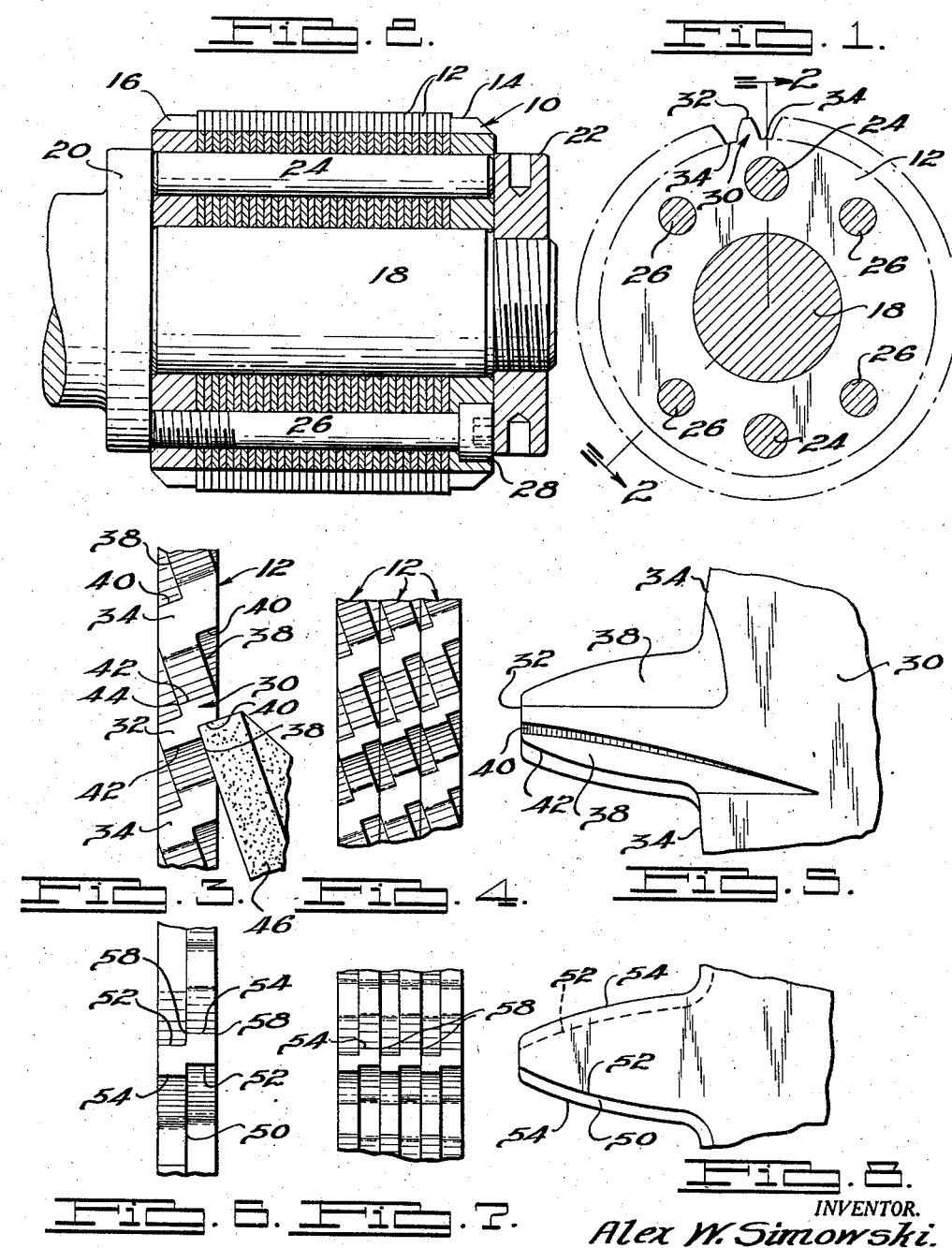
INVENTOR.
Alex W. Simowski.
BY
Harness, Dickey, Pierce & Hann.
ATTORNEYS.

Patented May 31, 1938

2,119,298

UNITED STATES PATENT OFFICE 2,119,298

GEAR FINISHING TOOL

Alex W. Simowski, Detroit, Mich., assignor to Michigan Tool Company, a corporation of Delaware Application November 18, 1935, Serial No. 50,381

3 Claims. (Cl. 29—104)

The present invention relates to cutting tools, and particularly to a cutting tool having a plurality of teeth, the surfaces of which present a series of lands and grooves, and which are built up from a plurality of similarly formed disc elements secured together in intimate relation.

It is an object of the present invention to provide a cutting tool which may be used to machine a gear to accurate dimensions and which may be economically manufactured, assembled and renewed.

Further objects of the present invention include the provision of a cutting tool built up of a series of similar discs which collectively form a tool having a plurality of alternate lands and grooves formed in the cutting faces thereof; in which the lands are provided with cutting edges on their forward lateral faces; in which the respective discs are formed to partially define the lands and grooves; in which the respective discs are each provided with a series of spaced teeth having portions cut away therefrom to define all or part of a land and an adjacent groove; and in which, when in assembled relation, the several discs present continuous teeth formed with successive lands and grooves.

• Further objects of the present invention include the provision of an improved cutting tool as above stated, which is applicable to either circular cutting tools of the gearlike type, or to cutting tools formed as racks; in which the tool teeth are adapted to cut through a lateral component of movement between such teeth and the teeth of the gear being finished; and which may be readily adapted for the finishing of either gears of the spur or helical types.

With the above and other objects in view, which appear in the following description and in the appended claims, a preferred embodiment of the present invention, as applied to cutting tools of the circular gearlike type, is shown in the accompanying drawing, throughout the several views of which corresponding reference characters are used to designate corresponding parts, and in which:

Figure 1 is a view in vertical section of a preferred embodiment of the present invention;

Fig. 2 is a view in section taken along the line 2—2 of Fig. 1;

Fig. 3 is a fragmentary developed view, in plan, of one of the discs used in assembling the tool shown in Figs. 1 and 2;

Fig. 4 is a view corresponding to Fig. 3, but illustrating a plurality of the discs in assembled relation;

Fig. 5 is a fragmentary view in side elevation of one tooth of one of the discs of Figs. 3 and 4;

Fig. 6 is a view corresponding to Fig. 3, but illustrating the application of the present invention to a tool of the spur type;

Fig. 7 is a view corresponding to Fig. 6, but illustrating a plurality of the discs in assembled relation; and Fig. 8 is a fragmentary view in side elevation of one tooth of one of the discs shown in Fig. 7.

It is found, in connection with the finishing of gears of either the spur or helical type, that the deformation of the gear teeth caused at the pitch line thereon by the slipping between the gear teeth and the tool teeth which occurs on each side of the pitch line when the gear and tool are rolled together, may be eliminated by running the gear with a tool with the axis of the gear at an angle to the axis of the tool. By disposing the axes of the gear and tool at an angle to each other in this manner, a lateral component of movement is introduced between the tool teeth and the gear teeth which compensates for and prevents the deforming of the gear teeth at the pitch line.

The co-pending applications of W. F. Dalzen, Serial No. 554,192, filed July 31, 1931 (case 25) and Serial No. 588,635, filed January 25, 1932 (case 32), both of which are assigned to the same assignee as the present application, disclose tools constructed to operate as above stated, and the present invention is directed principally to improvements in the manufacture of tools intended to operate in accordance with the principles disclosed in such applications.

In the form illustrated, the present invention is embodied in a cutting tool of the circular or gearlike type, although as will appear from a complete understanding of it, it is equally applicable to cutting tools of the rack type. The principles of the present invention are also applicable to cutting tools having various tooth forms, but is illustrated as embodied in a tool in which the teeth are of the involute form.

The circular gearlike tool of the present embodiment of the present invention is built up of a series of discs, each of which lies parallel to the plane of rotation of the tool, and are rigidly secured together to form a unit. In assembled relation the discs constitute a single tool having cutting teeth arranged around the periphery thereof, each cutting face comprising a plurality of similar lands which are separated from each other by similar grooves. The forward lateral edges of each of the lands are formed as cutting edges, and in the preferred practice of the present invention, all the cutting action of the tool is effected by such side cutting edges, which cut due to a lateral component of movement introduced between the gear teeth and the tool teeth by disposing the axes thereof at an angle to each other, as previously described.

Each of the discs are provided with teeth of the desired form cut into the peripheries thereof. To form the previously mentioned lands and grooves, a portion of the face of each disc tooth is cut away, so that the surface of each of said teeth constitutes all or part of one complete land and one complete groove. As illustrated, both faces of each tooth are cut away in this manner. The several discs are identical, as previously stated, so that when secured together, the discs present a continuous succession of similar lands and grooves.

Where the improved tool is designed for operation upon a gear of the spur type, the faces of the lands and grooves are disposed at an angle to the plane of rotation of the tool, or to the direction of movement of the tool surface, the angle of displacement being equal to the angle at which the axis of the gear being finished is displaced from the axis of the tool. As described in more detail in the previously identified applications, when the gear and tool are run together with this angular relation between them, a lateral component of movement occurs between the gear teeth and the tool teeth. The cutting edges of the gear being at the lateral edges of the lands formed in the tool teeth, all of the cutting accomplished by the tool is due to such lateral component of motion, and no cutting of any kind occurs due to the roll of the gear and tool. A finishing operation, therefore, involves no deformation of the gear teeth and the resulting completed gear teeth accurately conform to the desired form.

Considering the above described elements in more detail, and referring particularly to Figs. 1 through 5, an improved cutting tool designated generally as 10 comprises a plurality of similar disc-like elements 12 which are secured together between end plates 14 and 16, and are rotatably carried upon an arbor 18 which may be rotatably supported to feed the tool and gear into mating relation in any desired manner. Each of the discs 12 and the end plates 14 and 16 are provided with diametrically opposed, accurately dimensioned openings which receive correspondingly accurately ground centering pins 24 which, as will be understood, act to positively align all of the discs axially of each other. The discs 12 and end plates 14 and 16 are additionally apertured to receive assembly studs 26, which pass relatively freely through the discs, and are provided with externally threaded shanks which are threaded into end plate 16. The heads 28 of the assembly studs 26 are received in recesses cut into end plate 14. As shown in Figure 2, the assembly comprising discs 12 and end plates 14 and 16 are retained upon the arbor 18 between a shoulder 20 formed thereon and a collar 22 which may be threadably secured upon the end of arbor 18. As will be understood, collar 22 is turned on sufficiently to provide a positive driving connection between arbor 18 and the cutting tool 10.

The periphery of each of the similarly formed discs 12 is provided with teeth 30, preferably of the involute form, having crowns 32 and roots 34. The respective lands and grooves are formed by cutting grooves in the tooth faces of the respective discs 12, which grooves are bounded by the disc surfaces, such as 38 and 40. The edges 40 thus formed in each of the teeth 30 of the respective discs 12 thus constitute the faces of the grooves of the completed tool, and the portions 42 of the respective tooth faces not cut away in this manner constitute the lands of the completed tool. The forward lateral edges such as 44 of each land 42 are dressed to provide a cutting edge, effective to cut during lateral movement of the gear across the face of each land. The cutting of the discs may be accomplished in various ways, as by an illustrative tool 46, as shown in Figure 3.

Each of the disc elements 12 are complementarily cut so that upon assembly of a plurality of such discs together, as shown in Figures 1 and 2, the triangular tooth areas formed in the individual discs are disposed adjacent each other to form the rectangular tooth areas shown in Figure 4. It will be noted from Figure 4, that all of the joints between adjacent discs 12 fall at the bases of the grooves formed in the teeth, and that none of the cutting edges are positioned near the original surface of the respective discs. This arrangement is of substantial advantage in that all of the cutting edges are recessed from the normal surfaces of the discs, and thus are less subject to injury in handling than would otherwise be the case.

The tooth formations shown in detail in Figures 3, 4, and 5 are disposed at a predetermined angle with respect to the plane of the rotation of the tool, and as previously stated, this construction is particularly adapted for the finishing of gears of the spur type, although it may also be used for finishing spiral gears. In finishing a gear of the spur type, with the construction of Figures 3, 4 and 5, it will be understood that the axis of the gear being finished is disposed at an angle to the axis of the tool equal to the angular displacement of the tooth faces of the tool. In finishing a gear of the spiral type with a tool constructed as shown in Figures 3, 4 and 5, the angular displacement between the axis of the gear and of the tool is equal to the just described displacement angle plus or minus the spiral angle of the gear teeth. In either case, the finishing is accomplished by the cutting edges 44, as a consequence of the lateral component of movement between the gear and tool tooth faces.

The tooth formations shown in detail in Figures 6, 7 and 8 correspond in all respects to the formations shown in Figures 3, 4 and 5 with the exception that the tooth faces are disposed perpendicularly to the plane of rotation of the tool. Accordingly, the grooves cut therein in the formation of the disc are defined by edges such as 50, parallel to the plane of rotation of the tool, and the edges 52, normal to such plane of rotation. The completed teeth of each disc thus include lands 54 and grooves 52, the forward edges 58 of each of the lands being appropriately dressed to provide a cutting edge. It will be understood that a tool having the tooth formation of Figures 6, 7 and 8 is particularly adapted for the finishing of gears of the spiral type. In such finishing operation, the axis of the gear is disposed at an angle to the axis of the tool equal to the spiral angle of the gear teeth.

It will be evident that the completed tool, built up of the series of similar discs, may be quickly and economically assembled and disassembled, and the renewals of individual discs may be readily made. It will also be evident that by the use of discs, all of which are similar to each other, only one construction of such discs is required to be stocked for each type of tool. The individual discs of either the constructions shown in detail in Figures 3, 4 and 5 or that shown in Figures 6, 7 and 8 may, moreover, be very economically manufactured.

It will be understood that various changes and variations in the specific structure shown may be made within the spirit and scope of the present invention.

What is claimed is:

1. A gear finishing tool comprising a plurality of similarly formed toothed discs secured together and lying in planes parallel to the path of movement of the surface of the tool relative to a gear rolling therewith, one face of a tooth of each disc having a portion cut away at each side of said disc to define a land in said face, both lateral edges of which are spaced inwardly from the side of said disc, and both of said lateral edges being formed as cutting edges.

2. A gear finishing tool comprising a plurality of similarly formed toothed discs secured together and lying in planes parallel to the path of movement of the surface of the tool relative to a gear rolling therewith, each face of each tooth of each disc having a portion cut away at each side of said disc to define a land in said face, both lateral edges of which are spaced inwardly from the side of said disc, and both of said lateral edges being formed as cutting edges.

3. A gear finishing tool comprising a plurality of similarly formed toothed discs secured together and lying in planes parallel to the path of movement of the surface of the tool relative to a gear meshing therewith, the flanks of each tooth of each disc being cut away to define flat topped lands and adjacent grooves therein, said grooves in said opposed flanks being formed in opposite faces of said discs and the intersection of said grooves with said lands being at substantially right angles whereby to form cutting edges.

ALEX W. SIMOWSKI.